United States Patent
Kolberg et al.

(10) Patent No.: US 12,478,002 B2
(45) Date of Patent: Nov. 25, 2025

(54) MEDIUM-FLOWABLE BODY AND GREENING SYSTEM WITH AT LEAST ONE SUCH A MEDIUM-FLOWABLE BODY

(71) Applicant: VOSS AUTOMOTIVE GMBH, Wipperfürth (DE)

(72) Inventors: Ralf Kolberg, Cologne (DE); Anne Völkel, Cologne (DE); Jan Lösing, Gothenburg (SE)

(73) Assignee: VOSS Automotive GmbH, Wipperfürth (DE)

( * ) Notice: Subject to any disclaimer, the term of this patent is extended or adjusted under 35 U.S.C. 154(b) by 121 days.

(21) Appl. No.: 18/104,723

(22) Filed: Feb. 1, 2023

(65) Prior Publication Data

US 2023/0189720 A1 Jun. 22, 2023

(30) Foreign Application Priority Data

Dec. 1, 2021 (DE) .......................... 102021005947.6
Nov. 23, 2022 (EP) ...................................... 22020574

(51) Int. Cl.
*A01G 9/02* (2018.01)
*A01G 27/00* (2006.01)

(52) U.S. Cl.
CPC ........... *A01G 9/025* (2013.01); *A01G 27/005* (2013.01)

(58) Field of Classification Search
CPC .............................. A01G 9/025; A01G 27/005
See application file for complete search history.

(56) References Cited

U.S. PATENT DOCUMENTS

| | | | | |
|---|---|---|---|---|
| 2,753,277 A | * | 7/1956 | Smithers | A01G 5/04 428/524 |
| 3,334,440 A | * | 8/1967 | Choquette | A01G 27/006 428/17 |
| 3,552,654 A | * | 1/1971 | Thomas | B29C 44/507 261/99 |
| 3,842,535 A | * | 10/1974 | Lahr | A01G 31/02 47/79 |
| 4,034,508 A | * | 7/1977 | Dedolph | A01G 24/44 521/905 |
| 4,175,355 A | * | 11/1979 | Dedolph | A01G 24/48 47/64 |
| 4,218,415 A | * | 8/1980 | Biscaro | B29C 44/5654 249/97 |
| 4,235,561 A | * | 11/1980 | Peterson | E02B 11/005 405/45 |

(Continued)

FOREIGN PATENT DOCUMENTS

| | | | |
|---|---|---|---|
| CN | 207692497 U | 8/2018 | |
| DE | 3816866 A1 * | 11/1989 | ............. A01G 9/025 |

(Continued)

*Primary Examiner* — Ebony E Evans
(74) *Attorney, Agent, or Firm* — Hudak, Shunk & Farine Co. LPA (57) ABSTRACT

A body through which a medium can flow, in particular a body through which a fluid and/or gas can flow, with at least one exterior, wherein the body through which a medium can flow is self-supporting or includes at least one supporting body that provides mechanical stability, as well as a greenery system with at least one greenery element for installation on a surface, including at least one such body through which a medium can flow, in particular a body through which a fluid and/or gas can flow.

22 Claims, 5 Drawing Sheets

(56) References Cited

U.S. PATENT DOCUMENTS

| | | | |
|---|---|---|---|
| 4,926,585 A | 5/1990 | Dreschel | |
| 5,152,634 A * | 10/1992 | Maso | E02B 11/005 |
| | | | 405/45 |
| 7,198,431 B2 | 4/2007 | Gesser | |
| 8,122,642 B1 * | 2/2012 | Huberman | A01G 20/20 |
| | | | 71/24 |
| 9,532,518 B2 * | 1/2017 | Kotsatos | A01G 27/02 |
| 10,888,054 B2 * | 1/2021 | Storey | A01G 25/00 |
| 2008/0000153 A1 * | 1/2008 | Sugiyama | A01G 9/025 |
| | | | 47/47 |
| 2011/0225883 A1 * | 9/2011 | Clifford | A01G 9/033 |
| | | | 47/82 |
| 2011/0258925 A1 * | 10/2011 | Baker | A01G 9/023 |
| | | | 47/66.1 |
| 2015/0289452 A1 * | 10/2015 | Axley | F28C 3/06 |
| | | | 47/65.5 |
| 2016/0316645 A1 * | 11/2016 | Neufeld | A01G 31/02 |
| 2017/0181393 A1 * | 6/2017 | Nelson | A01G 27/00 |
| 2017/0290275 A1 * | 10/2017 | Storey | A01G 25/02 |

FOREIGN PATENT DOCUMENTS

| | | |
|---|---|---|
| DE | 202014102995 U1 | 9/2014 |
| EP | 2687648 A1 | 1/2014 |
| FR | 2872995 A1 | 1/2006 |
| KR | 20160095863 A | 8/2016 |
| WO | 2012000063 A1 | 1/2012 |
| WO | 2014163145 A1 | 10/2014 |
| WO | 2019137063 A1 | 7/2019 |

* cited by examiner

MEDIUM-FLOWABLE BODY AND GREENING SYSTEM WITH AT LEAST ONE SUCH A MEDIUM-FLOWABLE BODY

FIELD OF THE INVENTION

The invention relates to a body through which a medium can flow, in particular a body through which a fluid and/or gas can flow, with at least one exterior, wherein the body through which a medium can flow is self-supporting or comprises at least one supporting body that provides mechanical stability, as well as a greenery system with at least one greenery element for installation on a surface, comprising at least one such body through which a medium can flow, in particular a body through which a fluid and/or gas can flow.

BACKGROUND OF THE INVENTION

Bodies through which a medium can flow, such as those through which a fluid and/or gas will flow, are known in the prior art in the form of pipes for the supply and discharge of medium. Greenery systems for greening surfaces, such as vertical surfaces, for example the facades of buildings, are known. For example, so-called modular greenery systems are used as an alternative to classic facade greening, such as at the "Galeries Lafayette" department store in Berlin.

A vertical garden grows on its facade, wherein the foliage plants do not grow out of the ground or out of ground-level pots, but rather in the form of plant-covered modules installed on a facade. Grow bags and similar hanging systems for greening of, for example, facades, are also known. In these cases, plants grow out of special pots, grow bags, or substrate panels freely in space, wherein there are also irrigation devices as well as pumps and measuring instruments. Also known are trellises, made for example out of wood, plastic, metal, or fabric, which are placed on the facade of a building in the form of ropes, rods, and lattices.

Also known is a wall greenery system from the company GKR Hydro GmbH, wherein the plants grow in wall-greening modules. In this system, the uppermost wall-greening elements are either connected to a roof drain or are supplied with water from a rainwater tank via the pumps connected to this. The water then flows from the uppermost wall-greening element or plant module through its water overflow orifice and to the plant module below it. Water then flows to the next plant module below it, continuing like this until the lowest plant module is reached.

The water flows back into the rainwater tank from the lowest plant module, out of which it is then pumped back to the uppermost plant module. A climbing plant scaffold is built in front of the corresponding building facade, on which movable climbing plant containers are mounted on wheels. The climbing plant scaffold is attached to the building facade via anchor bolts. A ground foundation for building the protruding scaffold is required in order to attach the climbing plant containers. Decorative trim conceals the supply lines for delivering, or conveying, water to and from the plant containers.

Soil-bound, trough-bound, and wall-bound systems are to be differentiated. Soil-bound systems, such as those for ivy or wild vine climbing up a surface, have a maximum height limit for greening. Greening is not possible above this height because of the system. The formation of humus from decomposing leaves causes the plants to also develop, in addition to the delicate primary roots that attack the surface such as a facade to a minimal degree, strong root systems over the years that eat into the surface, or facade, and destroy it. Trough-bound systems or even partially-wall-bound systems comprise various plants from, for example, succulents to shrubs. The maximum growth height is limited here as well. Additionally, trough-bound systems require an irrigation system. These are seldom coordinated with the trough system, as they are conventional planters with standard facade-mounting technology. Wall-bound systems, also called "vertical gardens," are also known and are by far the most expensive. These systems are designed to be self-supporting because they are very heavy, in fact too heavy for direct attachment to a surface, such as a facade. The heavy weight of the greenery modules thus causes problems with attachment of modules and scaffolds to the wall, particularly with lightweight veneers, wall claddings, and thermal insulation, but also with other facade types.

The loads caused by greening of facade surfaces are quite considerable with these solutions of the prior art.

SUMMARY OF THE INVENTION

The present invention is based on the task of providing a greenery system that has at least one body through which a medium can flow, as well as a body through which a medium can flow for such a greenery system, that enables economic greening, in particular vertical greening, of facades or buildings, with any dimensions, wherein the greenery system enables easier management and maintenance than the known greenery systems, and can avoid destruction of the surface, such as the facade of a building, caused by the root system and irrigation system.

The task is solved for a body through which a medium can flow, in particular a body through which a fluid and/or gas can flow, with at least one exterior, wherein the body through which a medium can flow is self-supporting and comprises at least one supporting body that provides mechanical stability, wherein the body through which a medium can flow comprises at least one device for absorbing nutrients and/or fluid, wherein the exterior of the body through which a medium can flow is designed as a supporting device for supporting plants. The task for the greenery system is solved in that the greenery system comprises at least one greenery element for installation on a vertical surface, in particular a building facade or a wall element, and at least one medium supply device for feeding the at least one greenery element with medium and at least one medium discharge device for discharging medium from the at least one greenery element, wherein the at least one greenery element comprises at least one such body through which a medium can flow, in particular a body through which a fluid and/or gas can flow, and wherein the at least one body through which a medium can flow is or will be arranged in space such that there is a slope for generating a flow and/or distributing medium in the at least one body through which a medium can flow.

Developments of the invention are defined in the dependent claims.

Thereby established are a body through which a medium can flow and a greenery system with at least one such body through which a medium can flow, via which plants can be completely supplied with water and/or nutrients through the provision of the at least one device for absorbing nutrients and/or fluid of the body through which a medium can flow, the exterior of which is designed as a supporting device for supporting plants. The body through which a medium can flow is either self-supporting or comprises at least one supporting body that provides mechanical stability. This supporting body can be, for example, an I-beam.

The plants can tendril around or grow on the exterior of the body through which a medium can flow. It is thus no longer required to have numerous climbing plant containers and supply lines on a scaffold or to attach plant modules to the facade of a building, which is expensive; rather, the plants grow directly on the body through which a medium can flow of at least one greenery element of the greenery system. This brings with it not only economic advantages, but also advantages in terms of weight, as the greenery system is more economical than the known solutions and also weighs less than the known wall-bound systems. Growth of the plants to any height and simple management are nevertheless possible, in particular with low-maintenance plants, wherein the undesired penetration of roots into the facade does not occur.

In addition to the at least one greenery element that has at least one body through which a medium can flow, through which a medium such as fluid and/or gas can flow, the greenery system also comprises at least one medium supply device for feeding the medium, such as fluid and/or gas, to the at least one body through which a medium can flow, and at least one medium discharge device for discharging medium from the at least one greenery element. The at least one greenery element is located on a surface, for example an angled or vertical surface, such as the facade of a building. To enable an independent flow within the at least one body through which a medium can flow, this is or will be arranged in space such that there is a slope for generating a flow and/or a distributing medium in the at least one body through which a medium can flow. When the medium is fed from above into the at least one body through which a medium can flow in the operating position of the greenery element, it flows independently throughout this due to the force of gravity, or it distributes itself in this. With the advantageous provision of a medium outlet, the medium can flow back out of the at least one greenery element, or its at least one body through which a medium can flow. It is possible to recycle the medium, such as water, into a supply collection tank, and then feed it back into the at least one body through which a medium can flow of the greenery element.

The at least one device for absorbing nutrients and/or fluid is advantageously at least one open-cell foamed plastic, that is, at least one open-cell foam material, or it comprises at least one of such. The plants can be supplied with nutrients and/or fluid, such as water, via this device. The open-cell foamed plastic enables not only retention of fluid and nutrients in the numerous pores of such, but also unproblematic distribution of these to the plants. The pores are preferably located on the exterior of the device as open-cell foamed plastic so that they can be fed with fluid and nutrients directly. Further advantageously, the device can comprise at least one outer open-cell foam layer for stapling plants into and at least one inner foam layer for storing fluid, such as water, and nutrients.

The open-cell foamed plastic can be made based on, for example, at least one of the materials polyamide (PA), polypropylene (PP), polyethylene (PE), polyurethane (PUR), and/or at least one thermoset and/or at least one bioplastic, such as polylactic acid (PLA). It is also additionally or alternatively possible for the open-cell foamed plastic, that is, the foam material, to have a superabsorbent material. This enables fluid to be retained in the foam material particularly well. Advantageously, care is taken in this case to ensure that the fluid retained in the foam material can be retrieved by the plants. Other materials that yield an open-cell structure when foamed can alternatively also be used to produce the at least one device for absorbing nutrients and/or fluid.

The body through which a medium can flow can be designed, for example, as a media line or one or more media line sections, in particular a pipe or one or more pipe sections. A pipe or (a) pipe section(s) includes media lines and their sections of any cross-sectional shape and any diameter. For example, it is possible to design the body through which a medium can flow as a continuous pipe and to cut the individual pipe sections to the desired lengths. Of course, another possible alternative is to form bodies through which a medium can flow of different lengths directly as pipe sections, of different lengths if necessary.

Further advantageously, the body through which a medium can flow, in particular when designed as a pipe or (a) pipe section(s), can have on its end at least one connecting or interface section and/or at least one connecting device for connection with at least one further body through which a medium can flow and/or for connection with at least one medium supply or discharge device, such as a water intake point or a canal or drain system. The body through which a medium can flow can thus, for example, be cut into different pipe section lengths, and these can either be designed on their ends as connecting sections or have connecting devices on their ends, such as line connectors, via which they will be connected to other pipe sections and/or a medium supply or discharge device. Here, a water intake point is a medium supply device, whereas a drain system is a medium discharge device. The at least one connecting or interface section or the connecting device of the body through which a medium can flow, the connecting device being located on the end of the pipe section, can advantageously be adapted to the respective counterpart to which the body through which a medium can flow is to be connected or the connecting or interface section or connecting device thereof. In this way, it is easily possible to couple multiple bodies through which a medium can flow, in particular in the form of pipe sections, to a pipe system. A greenery element of the greenery system that is adapted to the respective application in any case can thus be constructed. Through provision of the individual pipe sections or the number of bodies through which a medium can flow, the at least one medium supply device, and the at least one medium discharge device, any combination of these components can be manifested, thus forming a variety of greenery elements. The greenery system is thus a modular greenery system.

Further advantageously, the body through which a medium can flow can be multi-layered, and the layers can be functional layers, wherein there is at least one water-guiding layer and/or at least one water-storing layer and/or at least one nutrient-storing layer and/or at least one layer for mechanical stabilization. The individual layers of the body through which a medium can flow, in particular in the form of a pipe or a pipe section, can thus fulfill various functions, one layer serving to guide water, the layer under it to store water, the layer under this to store nutrients, and the layer under this being for mechanical stabilization, all of which are exemplary. Of course, there can also be numerous other functional layers, which will be arranged above or below one another based on suitability. It is thus possible, via the different layers of the body through which a medium can flow, in particular in the form of a pipe or a pipe section, to supply the plants on its exterior with water, thus constantly supplying water to the plants, and also to supply them with the required nutrients. It is possible because of the mechanical stabilization layer to design the body through which a medium can flow to be self-supporting. Alternatively, there can be a supporting body that provides mechanical stability to the body through which a medium can flow. If there is such a supporting body, which can be designed not only in the form of an I-beam, but also in particular in the form of a pipe, this can be covered completely or partially with the at least one device for absorbing nutrients and/or fluid. Such a supporting body also improves protection of the body through which a medium can flow against warping and creeping.

At least one of the layers of the multi-layer body through which a medium can flow can be semipermeable. Such a semipermeable layer can be arranged between the fluid and the foamed plastic as, for example, a filter layer. This enables the advantageous distribution of water, or general fluid, and nutrients in the direction of the plants that are on the exterior of the body through which a medium can flow. The at least one semipermeable layer is thus permeable in the direction of the plants for the distribution of water or nutrients, but it is impermeable in the opposite direction. This can prevent the infiltration of contamination coming from the plants into the body through which a medium can flow, in particular into its layers that are under the semipermeable layer of this.

The body through which a medium can flow can be designed in particular as a hollow body and can have at least one inner flow lumen and at least one wall that surrounds this, which is surrounded at least in part or in sections by the at least one device for absorbing nutrients and/or fluid, and/or the body through which a medium can flow can be formed entirely out of foam material made of at least one open-cell foamed plastic. It is also possible to fill at least one inner flow lumen of the body through which a medium can flow with foam material made of at least one open-cell foamed plastic. In any case, fluid transport and gas transport are possible through the body through which a medium can flow in the longitudinal direction. Medium in the form of, for example, water and/or water mist and/or gas can flow through the at least one inner flow lumen of the body through which a medium can flow designed as a hollow body, and/or through the pores of the foam material of this.

The body through which a medium can flow can for example have an outer diameter of 2 cm to 20 cm. The shape of the profile of the body through which a medium can flow, in particular in the form of a pipe or one or more pipe sections, can be round and/or polygonal and/or oval and/or asymmetrical or irregular. The body through which a medium can flow can also have a different profile in sections along its length. This can be selected according to the application.

Further advantageously, it has at least one device for moisture retention of the at least one body through which a medium can flow. In particular, the body through which a medium can flow can have inside, for example inside at the end, at least one valve device for medium supply control and/or for medium discharge control for controlling the supply and/or preventing the discharge of medium from the inside of the body through which a medium can flow. There can thus be, for example, a valve flap inside at the end of the body through which a medium can flow, in particular in the form of a pipe or at least one pipe section, to prevent undesired discharge of medium out of the inner flow lumen of the body through which a medium can flow. This makes moisture retention of the body through which a medium can flow very easy to accomplish. Provision of such a valve device is also possible near a supply line and/or discharge line that is or can be connected to the at least one body through which a medium can flow. It is also possible to achieve this effect without a valve device, such as by provision of a recirculation system or through appropriate design of the hydrostatics of the greenery system without operation of a valve device, and to still retain moisture in the body through which a medium can flow. For example, it is possible to include one or more spring flaps, which can prevent unwanted discharge of medium out of the inner flow lumen.

The body through which a medium can flow can further advantageously have at least one exterior supporting device for supporting plants and/or for arranging at least one lighting device, at least one solar module, or at least one advertising device. In particular, the supporting device can be at least one perforated sheet or wire mesh panel on the exterior of the body through which a medium can flow. The body through which a medium can flow can for example have the supporting body and, at a distance from this, the exterior supporting device, in particular in the form of at least one perforated sheet, wherein the supporting body and the exterior supporting device, or the at least one perforated sheet, are separated from each other by one or more dividers. The at least one device for absorbing nutrients and/or fluid can be arranged in the ring segments, or segments, formed by the dividers, the supporting body, and the exterior supporting device, such that plants can grow on the exterior of the body through which a medium can flow in this ring segment or segment. In the ring segment(s) in which there is no device for absorbing nutrients and/or fluid, there can be for example at least one LED as a lighting device and/or at least one solar cell for power generation and/or advertisement on the exterior of the supporting device.

To be able to orient the body through which a medium can flow toward the exterior of a building or a facade or a wall element, it further advantageously has at least one drive device for targeted orientation of the body through which a medium can flow. Such a drive device can be on the end of the body through which a medium can flow and can be turned for example by an electric drive. In this way, the greened segment, a segment with at least one solar module, a segment with a lighting device, or a segment with an advertisement can be rotated as needed to the outside, and thus toward sunlight, or the exterior of a building, facade, wall element, etc.

The greenery system can, as mentioned above, be constructed modularly and comprise a number of bodies through which a medium can flow in the form of pipe sections, which are or can be connected to one another in a releasable way. In particular, the pipe sections are or can be connected to one another in a releasable way via plug connection. The pipe sections can essentially also be pressurized so that if there is such a releasable connection, in particular in the form of a plug connection, this is considered through a suitable selection of plug connections via which the individual pipe sections can be connected to one another.

The greenery system can be designed as a self-sufficient unit and can comprise the at least one medium supply device, in particular a water supply device, at least one pump device for conveying medium to the at least one body through which a medium can flow of the at least one greenery element, and at least one power supply device for supplying the pump device with power, in particular based on photovoltaic or wind power. This proves to be particularly advantageous for a vertical greenery system, for which the pumping of fluid, such as water, to the body through which a medium can flow of the greenery element(s) is required. In particular, by supplying from a photovoltaic system or, for example, a micro wind system, power can be supplied to the at least one pump device in a self-sufficient way, so that feeding of water into the at least one body through which a medium can flow can be permanently ensured. The water supply can be implemented by rainwater, for example by connection of at least one body through which a medium can flow to a rain gutter, water from the ground, for example of a canal system, and/or from a cistern. When water is extracted from the ground or from a cistern or another type of water reservoir, at least one pump device is usually required to convey the water up to the at least one uppermost body through which a medium can flow of the greenery system. Irrigating with gray water is also possible, wherein gray water is supplied to the at least one body through which a medium can flow of the greenery system. Connection of the greenery system to a retention roof is also possible, so that feeding of water into the at least one body through which a medium can flow of the greenery system can occur thereby.

To prevent blockage or clogging of the at least one body through which a medium can flow of the at least one greenery element or a pump device of the greenery system, it is possible to provide at least one filter element for filtering the inflowing fluid, such as rainwater. The filter element can for example be in the area of the medium supply device, such as a supply line. The at least one filter element thereby filters out suspended solids that can clog the pump device or the pores of the open-cell foamed plastic of the body through which a medium can flow. Of course, it is essentially also possible not to have a filter element.

Further advantageously, in the operating position, that is, the essentially vertical position in space of the greenery element, the at least one body through which a medium can flow can be horizontal and/or vertical and/or at at least one angle to vertical. This enables the body/bodies through which a medium can flow to be not only vertical and/or horizontal, but also at an angle, which generates a flow that is not as strong as with a vertical arrangement of the body/bodies through which a medium can flow. The selection of the angle of the body/bodies through which a medium can flow can in particular also set the retention time of the medium, such as fluid or gas, in the body through which a medium can flow.

Further advantageously, the plants on the exterior of the at least one body through which a medium can flow can be supplied with water via the capillary effect of the open-cell foamed plastic. It is likewise possible to realize the water supply of the plants or plant layer that are or will be on the exterior of the at least one body through which a medium can flow via the capillary effect of riser pipes, wherein in particular the at least one inner flow lumen of the at least one body through which a medium can flow serves as such a riser pipe. The at least one body through which a medium can flow is, in this case in particular, vertical in regard to the operating position of the greenery element and the spatial orientation in the three-dimensional space surrounding the body through which a medium can flow and the greenery element.

It is also possible to attach the at least one greenery element and/or its at least one body through which a medium can flow to a building, or its facade, or to a wall element, such that it is fixed. It is likewise possible to attach the at least one greenery element and/or its at least one body through which a medium can flow to a building, or its facade, or to a wall element such that it is movable. Fixed attachment to a facade or a wall element can for example be implemented by the provision of a number of bodies through which a medium can flow parallel to each other, which are horizontally above one another and are connected to one another in terms of fluid. A first body through which a medium can flow can be connected to a rain gutter, and a last body through which a medium can flow can be connected to a canal system. The bodies through which a medium can flow that are connected via fluid or flow can thus be permanently installed in front of or on a facade or a wall element of the building, whereby the individual bodies through which a medium can flow can be attached there such they are fixed—that is, immovable. A self-supporting structure can be realized by, for example, a steel beam profile structure as a facade face. Attachment to the facade itself can occur only for stability, but not for actual attachment of the greenery system.

The latter is designed to be self-supporting; therefore, it stands on its own and does not require further attachment to the facade of a building. The individual bodies through which a medium can flow can be connected among themselves to one or more greenery elements that have intrinsic stability and thus will only be connected to a rain gutter via a supply line and to a canal system via a discharge line.

A greenery system in the form of a shading system that will be in front of one or more windows of a building, wherein the slats of the greenery element have at least one body through which a medium can flow or are or will be formed as such, constitutes an example of a movable attachment of the at least one greenery element or of its at least one body through which a medium can flow to a building, or its facade, or a wall element. The slats are movable so that accordingly the at least one body through which a medium can flow, which forms or has a slat, is or will be attached to the building or its facade or wall element, in particular in front of a window of the building, such that they can be moved. The slats of the shading system or the greenery element can or will be connected in terms of fluid via media lines, in particular via hoses, with one another and/or with at least one medium source of the greenery system. The media line can be connected for example to a rain gutter or a retention roof of a building for water supply. Of course, the supply of water from the ground and/or a cistern or another water reservoir and/or the supply of gray water, as described above, is possible.

The at least one greenery element not only can be installed on a wall element or a facade of a building, but it can also be designed as at least one facade element or wall element of a building. Herein as well, it is possible to make a fluid connection with the at least one medium supply device, for example a rain gutter, for supply of medium such as water on one side, and the at least one medium discharge device, such as a canal system in the ground for discharging the medium such as water on the other side. For example, the at least one greenery element can serve as a wall element of a pavilion, or a wall element of a pavilion can have at least one such greenery element.

Moisture retention of the at least one body through which a medium can flow of the greenery system is possible, for example, by a partitioning device that prevents discharge of the medium out of the body through which a medium can flow and/or the medium discharge device. Such a partitioning device can for example take the form of a valve device in the ground, that is, in the location where the medium is discharged out of the greenery element and opens into the ground. The valve device can for example be a funnel-shaped device or a diaphragm valve. As explained above, there can also be a valve device, (a) spring valve(s), or another device in the area of the medium supply device, in order to create the possibility of controlling the supply of medium in the area of the medium supply device as well.

BRIEF DESCRIPTION OF THE DRAWINGS

For further explanation of the invention, the following example embodiments thereof are described in more detail below with reference to the drawings. Shown in the figures are:

FIG. 9a A perspective view of a body through which a medium can flow according to the invention designed as vertical slats, with a cover plate on the end and an unoccupied exterior surface for provision of lighting, solar cells, advertisement, etc.

FIG. 9b A cross-sectional view through the body through which a medium can flow according to the invention according to FIG. 9a.

DETAILED DESCRIPTION OF THE INVENTION

Figure 1:
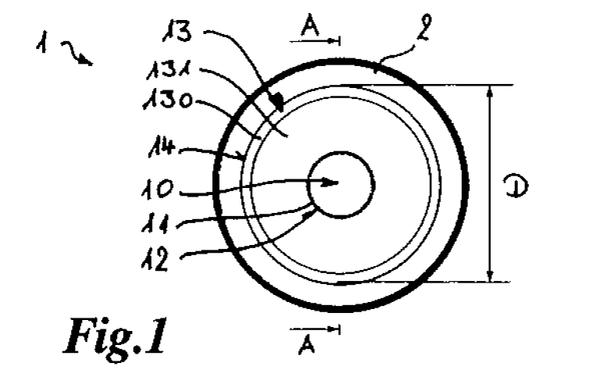
FIG. 1 A cross-sectional view of a body through which a medium can flow according to the invention.
Figure 2:
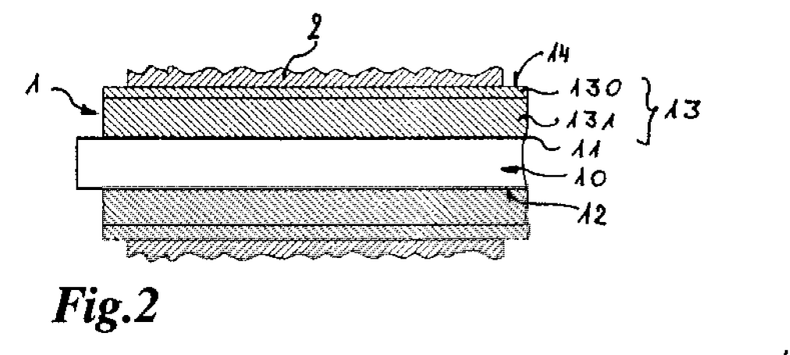
FIG. 2 A longitudinal view of the body through which a medium can flow according to FIG. 1, cut along the Line A-A.

FIGS. 1 and 2 show a body through which a medium can flow 1 in the form of a pipe. The body through which a medium can flow 1 has an inner flow lumen 10, through which a medium such as fluid and/or gas can flow. The inner flow lumen 10 is surrounded by a supporting body 11 that provides mechanical support, wherein the supporting body 11 is designed here as a pipe. On the exterior 12 of the supporting body 11 is a device for absorbing nutrients and/or fluid as a layer 13 for medium storage. The medium here can be, for example, water. The device or layer 13 for absorbing nutrients and/or fluid is made out of at least one open-cell foamed plastic, that is, an open-cell foam material. A plant layer 2, which is grown or located on the exterior 14 of the body through which a medium can flow 1 and thus the device or layer 13, can attach and take hold particularly well on the device or layer 13 because of the open-cell plastic material.

The supporting body 11 can consist of a material that is permeable in particular to fluid in order to supply the device or layer 13 around it with fluid, in particular water. The supporting body 11 can also be designed such that it is impermeable to water, for example as a T-beam, an I-beam, or another type of supporting body. It can also serve for example as a closed pipe that is only for the supply and discharge of medium. Furthermore, it can also span only through a partial section of the device or layer 13 for absorbing nutrients and/or fluid in the form of a foam body. The latter can comprise at least one outer open-cell foam layer 130 for stapling plants into and at least one inner foam layer 131 for storing fluid, such as water, and nutrients (see FIGS. 1 and 2). The outer foam layer 130 can preferably be made of polypropylene (PP) or at least one bioplastic, such as polylactic acid (PLA). The inner foam layer 131 can be made for example out of polyurethane (PUR) or another foam material.

The plant layer 2 on the exterior 14 of the body through which a medium can flow 1 will be supplied with nutrients and/or fluid, thus in particular water or an aqueous solution, that for example can flow through the supporting body 11, via the device 13 or inner foam layer 131. The device 13 or inner foam layer 131 and the outer foam layer 130 can completely encircle the supporting body 11. It is likewise possible for the device 13 or the inner or outer foam layer 131 or 130, respectively, to surround the supporting body 11 only in part.

The body through which a medium can flow 1 serves as the support for the plant layer 2 and can be oriented vertically, horizontally, or at an angle. This is to be regarded in particular in FIGS. 4 through 7a, which will be described in more detail below.

The body through which a medium can flow 1 can also be provided without the supporting body 11, in which case the device for absorbing nutrients and/or fluid 13 is designed to be self-supporting. In this case, it has sufficient mechanical stability, so that an additional supporting body 11 under this inside the body through which a medium can flow 1 is not required. As described above, this can also span only over a partial section of the body through which a medium can flow 1 for the supply and discharge of medium.

It is also possible to construct the body through which a medium can flow 1 in multiple layers, wherein different functional layers are arranged one on top of the next. For example, a layer that provides mechanical stability can be the innermost layer, which surrounds the flow lumen 10, as long as there is no supporting body 11, followed by a nutrient-storage layer, a fluid-storage layer, and a fluid-guiding layer. Other functional layers can also be provided. It is also possible to keep the inner flow lumen 10 open on one side as a cavity for fluid such as water to flow, such as in the embodiment shown in FIGS. 1 and 2. It is likewise possible to fill this with foam material and/or, for example, absorbent granules (see FIGS. 9a, 9b), through which the fluid and/or gas or general medium can flow.

The open-cell foamed plastic of the device 13 or the inner or outer foam layer 131 or 130, respectively, can contain a superabsorbent material to improve fluid retention. Because superabsorbent material is inherently intended for the retention of fluids and for the prevention of distribution, there is advantageously at least one device for enabling and/or improving distribution of the fluid retained in the superabsorbent material to the plants.

The open-cell foamed plastic, that is, the open-cell foam material, can be made based on, for example, polyamide (PA), polypropylene (PP), polyethylene (PE), polyurethane (PUR), or at least one thermoset or at least one bioplastic, such as polylactic acid (PLA). Other polymers that are open-cell in their foamed state can also be used here. The combination of several foam materials is possible, in particular when forming a multi-layer body through which a medium can flow 1. The individual layers or at least one of the layers can also be designed as a semipermeable layer, that is, only permeable in one direction, in particular to water. A barrier in the other direction is thus created, so that in particular the passage of water in only one direction is enabled. The direction of passage is advantageously in the direction of the plant layer 2 on the exterior 14 of the body through which a medium can flow 1 or the device 13 for absorbing nutrients and/or fluid. For example, such a semipermeable layer can be arranged as a filter layer between the inner flow lumen 10 and the device 13 for absorbing nutrients and/or fluid in the form of at least one foamed plastic.

The outer diameter D of the body through which a medium can flow 1 in the embodiment as a pipe, or with an internal supporting body 11 in the embodiment as a pipe, such as is shown in FIGS. 1 and 2, can be for example 2 cm to 20 cm. Other diameters are also possible, wherein the range of 2 cm to 20 cm is particularly advantageous with regard to water transport, weight, and plant growth.

Instead of the round shape of the body through which a medium can flow 1 designed as a pipe according to FIGS. 1 and 2, this or these can also be oval and/or polygonal and/or asymmetrical or irregular in profile. The body through which a medium can flow 1 can thus be adapted in form to the respective application. The body through which a medium can flow 1 can also have different cross-sections and also different dimensions along its length in sections.

Figure 8:
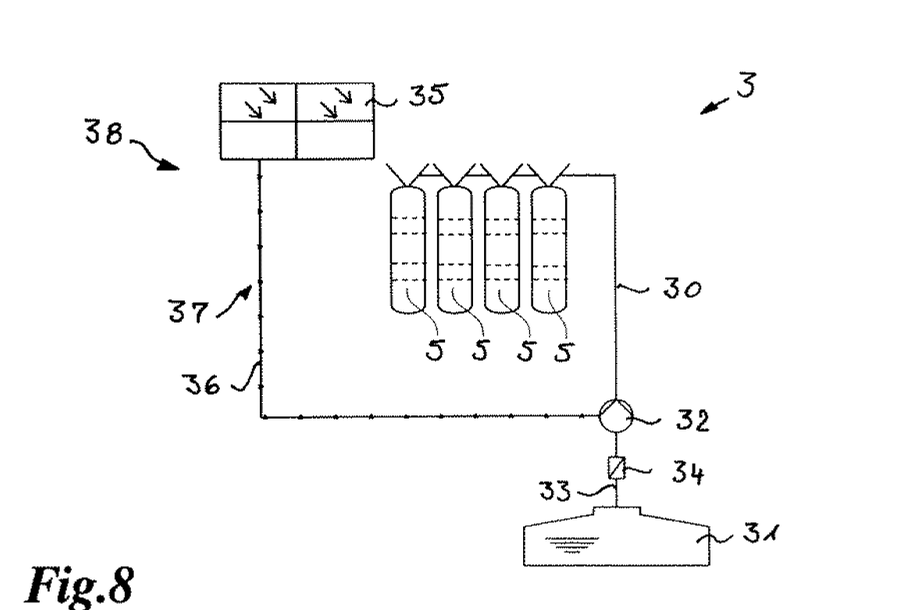
FIG. 8 A schematic sketch of a medium supply device of a greenery system according to the invention with a number of greenery elements with bodies through which a medium can flow according to the invention, a pump device for conveying water out of a water reservoir, and solar modules via which the pump device will be supplied with power.

A polygonal profile opens the possibility of using individual surfaces for different purposes, that is for example, two of the three sides of a triangle profile can be greened and one, or the third, side can have one or more solar cells to supply a photovoltaic system and thus provide electrical power to supply for example a pump device 32, as shown in FIG. 8, that serves to recycle the medium from an area of the ground to a body through which a medium can flow 1 or for the transfer of medium from a reservoir to a body through which a medium can flow 1 that is higher up.

On the open-cell surface of the at least one outer foam layer 130 or the device 13, the plants can take hold very well in forming the plant layer 2 and can be nourished this way. The plants of the plant layer 2 can thus be completely supplied with water and/or nutrients via the body through which a medium can flow 1, wherein either only water together with nutrients flows through the body through which a medium can flow 1, in particular its supporting body 11, to the plants of the plant layer 2 via the device 13 for absorbing nutrients on the exterior of the body through which a medium can flow 1, or if the supporting body 11 is omitted, through the individual layers of the body through which a medium can flow 1, which is multi-layered if applicable, still at least through its device 13 for absorbing nutrients and/or fluid, to the plants of the plant layer 2.

In particular when manufacturing a body through which a medium can flow 1 in the form of a pipe, this can be cut to individual pipe section lengths as needed. The individual pipe sections can then be connected to one another or to supply lines for delivering medium, such as water and nutrients, as is suitable for an individual case. Such a connection can be accomplished for example by plug connections. Accordingly, the pipe sections created by cutting to length can have suitable connecting or interface sections or line connectors at the end to add the individual pipe sections to a pipe system or to connect them to medium supply or discharge devices, such as for example a water intake point or a drain system.

Figure 3:
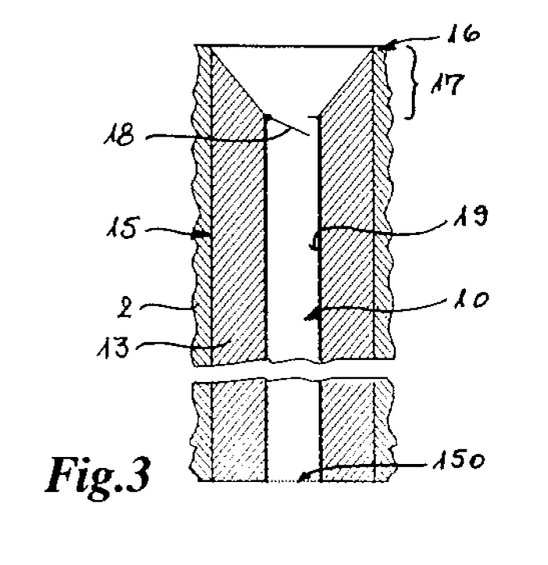
FIG. 3 A longitudinal view through a second embodiment of a body through which a medium can flow according to the invention.

Such a pipe section 15 is shown in FIG. 3. This has on its end 16 a section 17 that is funnel-shaped on the inside and a valve flap 18 as a valve device in the funnel-shaped section 17. This is thus located in the interior 19 of the pipe section 15 or its device for absorbing nutrients and/or fluid 13 such that the valve flap 18 in the supply closes via spring force to prevent the interior from drying out even with low water levels. It opens toward the inside of the inner flow lumen 10 to enable the inflow of medium, such as water, into the inner flow lumen 10 of the pipe section 15. After closing the valve flap 18, moisture, or water, can be retained inside the pipe section 15, or very generally, inside the body through which a medium can flow 1. Moisture retention of the pipe section 15 and thus maintenance of the water supply of the plant layer 2 on its exterior is thus possible. At the other end of the pipe section 15 or on further pipe sections 15 connected with this, there can likewise be for example a valve device, in particular a valve flap like valve flap 18, to prevent the discharge of water out of the inner flow lumen 10 of the pipe section 15 and thus to retain a sufficient volume of water in the pipe section(s) 15 so that the plant layer 2 on the exterior of the pipe section(s) 15 can be constantly supplied with water and nutrients. Instead of the valve flap 18, as examples, a recirculation system or the hydrostatics of the greenery system can be designed such that medium is retained inside the at least one pipe section 15.

In particular, there can also be a corresponding valve device in the area of a media line connected to the pipe section 15 leading into an area of the ground 61 in front of or under a building 6 to discharge the medium, such as water, that is discharged from the pipe section 15 there. Such a valve device 150 can for example be a funnel-shaped device or a diaphragm valve, which is implied in FIG. 3 at the end of the pipe section 15.

Figure 4:
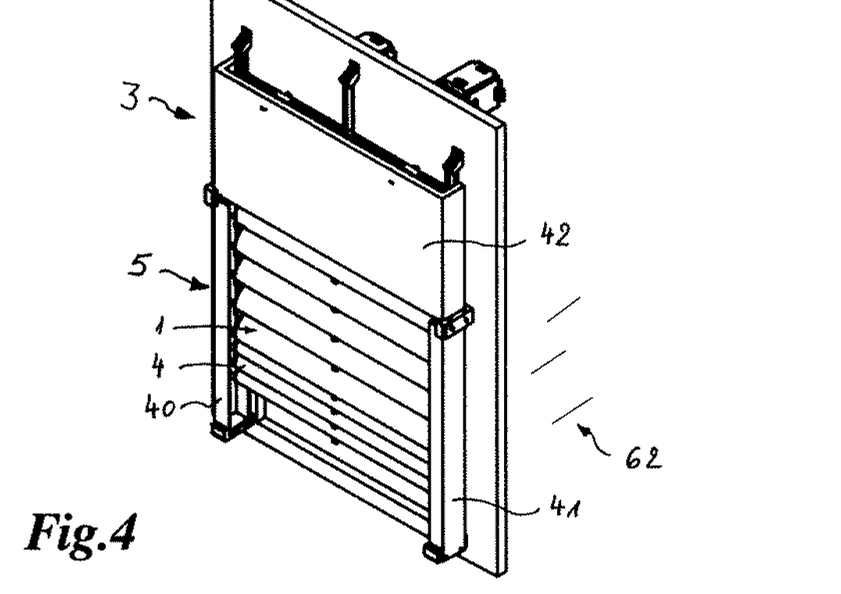
FIG. 4 A perspective view of a greenery element according to the invention in an embodiment as a shading system, which has bodies through which a medium can flow according to the invention that are designed as slats.
Figure 5:
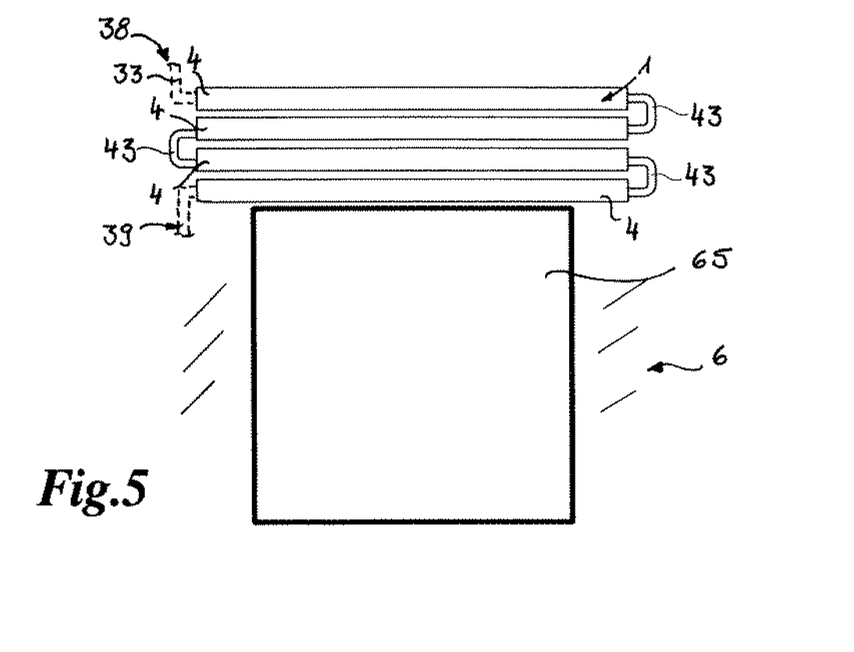
FIG. 5 A front view of a body through which a medium can flow according to the invention of a greenery system according to the invention, arranged horizontally over a window of a building and designed as slats.

In FIG. 4, a greenery element 5 of a greenery system 3 is shown that is designed here as a shading system for shading a window 65 of a building 6. The greenery element 5 comprises here for example eight slats 4, which each have one body through which a medium can flow 1, to enable greening. The number of slats 4 can be selected according to the application. The slats serve to provide shade and are retained on their ends in two guide rails 40, 41 that are approximately parallel to one another. Connecting both guide rails 40, 41 to one another is a shade element 42 above the slats 4, which covers the adjusting devices etc. for operating and adjusting the slats 4. To connect the individual slats 4 with one another in terms of fluid, these can be connected via media lines, for example in the form of hoses 43, as shown in FIG. 5, in terms of fluid.

Instead of hoses, fluid connectors can also be used, such as copper pipe connectors or other types of connectors. The uppermost slat 4 can be supplied with fluid, in particular water, via a supply line 33 of a medium supply device 38, as shown in FIG. 8 as an example. The fluid or water flows into the first slat 4, through this, to the other end of the slat 4 via the hose 43, into the second slat 4 underneath, through this to the hose 43 and the other end of the second slat 4, through this into the third slat 4 underneath, through this to its opposite end, from this into another hose 43 located there, and out of this into a fourth slat 4 below the third slat 4. After flowing through this fourth slat 4 as well, the fluid such as water can discharge at the other end of this into a medium discharge device 39. The latter can comprise a media line, which for example opens into the ground 61 in front of the building 6, which is not shown, however, in FIG. 5. Instead of this series circuit, there can also be a parallel circuit of the slats 4 or a mixed series-and-parallel circuit. In FIG. 5, the four slats 4, shown as examples, are approximately horizontal and are arranged one on top of the next over an implied window 65 of the building 6 that is only implied. Instead of this, there can also be a different number or arrangement of slats 4.

Figure 6:
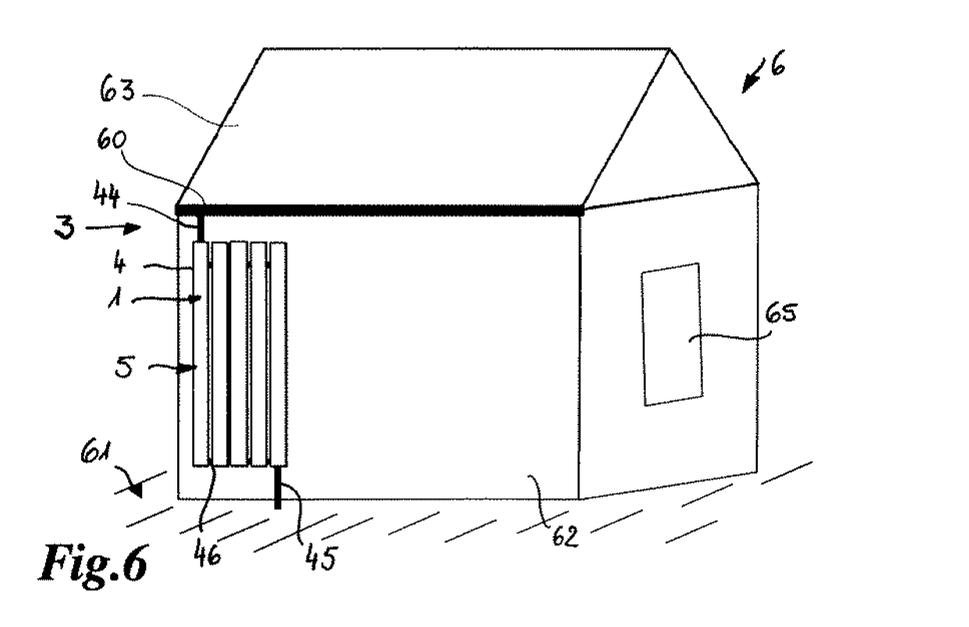
FIG. 6 A perspective view of a building with a greenery element according to the invention in front of its facade, which comprises several bodies through which a medium can flow according to the invention that are parallel to each other, which are connected to a rain gutter of the building on one side and a canal system on the other.

Instead of the horizontal operating position arrangement of the bodies through which a medium can flow 1 in the slats 4 or the body through which a medium can flow 1 designed as slats 4, this can also have an approximately vertical orientation, such as the embodiment variant shown in FIG. 6, or be oriented at any angle to the vertical or horizontal. In FIG. 6 as well, the five bodies through which a medium can flow 1 in the form of slats 4, shown as examples, form a greenery element 5. The first slat 4 is connected to a rain gutter 60 of a building 6 in terms of fluid via a supply line 44, and the fifth and thus last slat 4 opens into a canal system in the ground 61 in front of the building 6 via a discharge line 45. The canal system is, however, not shown in FIG. 6. The slats 4 oriented vertically in this embodiment variant of the greenery element 5 of the greenery system 3 are also connected with one another in terms of fluid via connecting lines 46. Furthermore, the slats 4 are mechanically connected together to the greenery element 5. The five slats 4, shown as examples, connected together to the greenery element 5, including the bodies through which a medium can flow 1, thus form one unit that can be arranged and attached in front of or on a facade 62 of the building 6. The greenery element 5 can thus be installed such that it is fixed to the building 6 or its facade 62, and connected on one side to a rain gutter or another water collecting element 60, located in particular in the area of the roof 63 of the building 6, and it can be connected on the other side to the ground 61 or a canal system therein. These slats 4 can also be retained such that they are fixed or movable in the corresponding guide rails to be able to locate them, for example, in front of the window 65 of the building 6 so that the greenery element 5 is then part of a shading system for the window 65.

Figure 7:
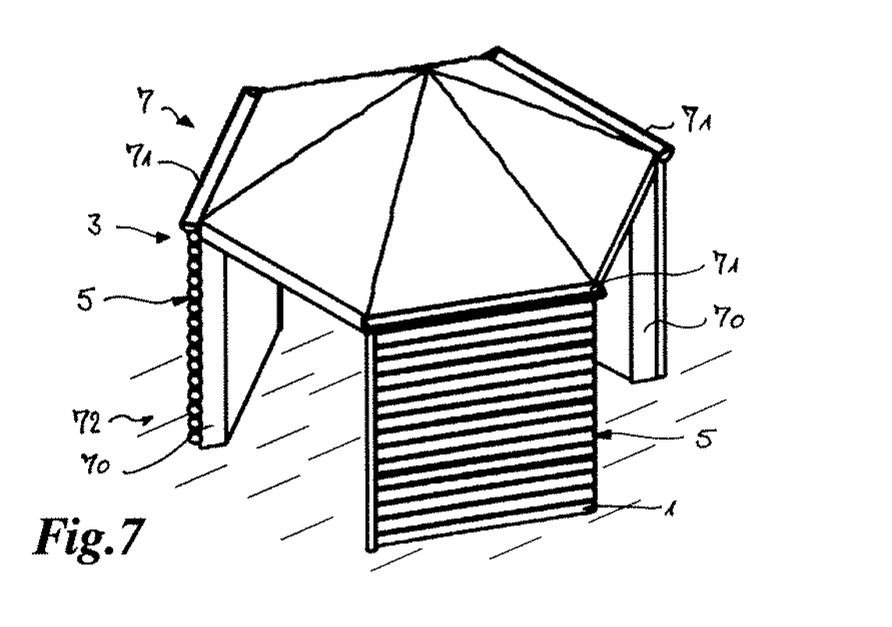
FIG. 7 A perspective view of a pavilion that has a further embodiment of a greenery element according to the invention with bodies through which a medium can flow according to the invention that are horizontally one above the next.
Figure 7A:
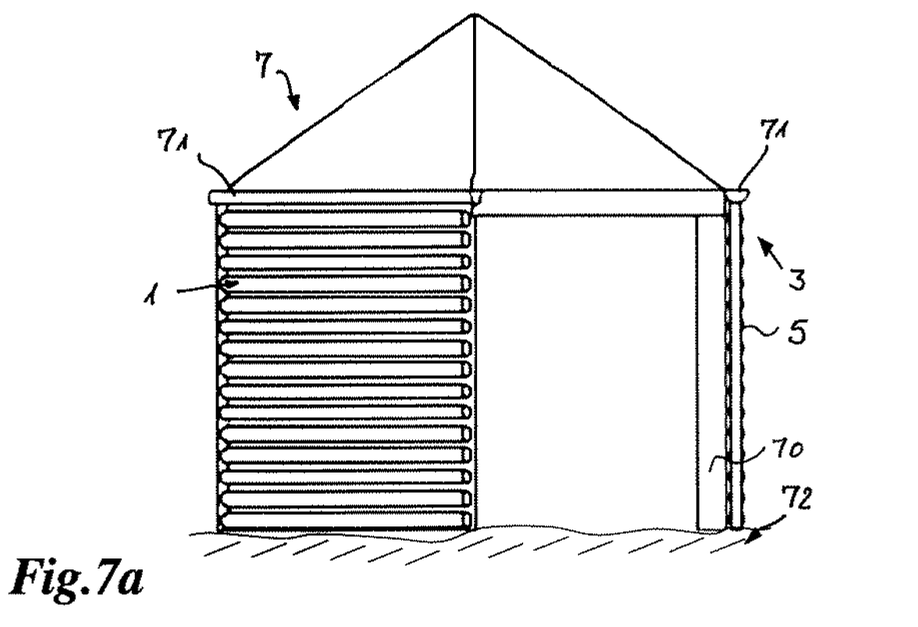
FIG. 7a A side view of the pavilion according to FIG. 7.

In FIGS. 7, 7a, a further embodiment of greenery elements 5 of the greenery system 3 is shown. Herein, there is a number of bodies through which a medium can flow 1 that are oriented approximately horizontally and parallel to one another on the wall elements 70 of a pavilion 7. Alternatively, the greenery elements 5, or at least one of these, can be designed to be self-supporting so that the wall elements 70 can be omitted and the greenery elements 5 themselves can form the wall elements.

The wall elements 70 of the pavilion 7 can be greened by the greenery elements 5 in that one plant layer 2 can in turn grow or be located on each of the bodies through which a medium can flow 1. With this embodiment variant of the greenery elements 5 as well, the bodies through which a medium can flow 1 are connected to one another in terms of fluid, wherein in particular the respective uppermost body through which a medium can flow 1 is or will be connected to a water collection element in the form of a rain gutter 71 via a supply line, which is not shown in FIGS. 7, 7a, whereas the lowest body through which a medium can flow 1 will be connected with an area of the ground 72 that the pavilion 7 is on in terms of fluid via a discharge line, which is likewise not shown, so that the uppermost body through which a medium can flow 1 can be fed with rainwater captured by a water collection element in the form of a rain gutter 71 via the supply line, the water being sent from the respective body through which a medium can flow 1 above to the one below it, via respective connecting lines between the individual bodies through which a medium can flow 1, until finally at the lowest body through which a medium can flow 1 after the flow-through of the rest of its medium, in particular water, is discharged out of this to the outside via the discharge line and into the ground 72, in particular to a collecting container located there, such as a cistern or a canal system.

Instead of a horizontal or vertical orientation of the bodies through which a medium can flow 1, or slats 4, which these have or form, a respective greenery element 5 can also have bodies through which a medium can flow 1 oriented in any direction, that is, in particular such that they are at an angle to the vertical whereby the retention time of the fluid, such as water, inside the body through which a medium can flow 1 can be set via the selection of the angle of the bodies through which a medium can flow 1. Hydrostatic effects can thus be used optimally.

As long as a recycling of medium, in particular water, from the ground back to the uppermost body through which a medium can flow 1 of the greenery element 5 of the greenery system 3, or a transfer from a water reservoir, such as a cistern or a canal system, to the uppermost body through which a medium can flow 1, should occur, this can occur for example via a pump device 32 of the medium supply device 38, as shown in FIG. 8. The greenery system comprises here four greenery elements 5, for example such as those shown in FIGS. 4 through 7a, each of which can comprise a number of bodies through which a medium can flow 1. This will be supplied with medium or water from a water reservoir 31 via a supply line 30, transferred via the pump device 32. To filter solids out of the water, which will gather in the water reservoir 31, before the water reaches the pump device 32 and clogs or damages it, there is a filter element 34 in a supply line 33 between the water reservoir 31 and the pump device 32. To supply the pump device 32 with power, it very advantageously has a self-sufficient power supply from a power supply device 37, which can have for example a photovoltaic system with solar modules or even a micro wind system. Shown in FIG. 8, for example, are solar modules 35, which are connected to the pump device 32 via an electrical line 36. The greenery system 3 is thus self-sufficient, as the pump device 32 can be permanently supplied with power via the solar modules 35, so that water from the water reservoir 31 can be continuously supplied to the greenery elements 5 of the greenery system 3, which can comprise a number of bodies through which a medium can flow 1, via the supply lines 33, 30. In particular, this can also have a return line back to the water reservoir 31, which can be part of the medium discharge device 39. The water that was not absorbed by the plants of the plant layer 2 that surrounds the body through which a medium can flow 1 can be returned to the water reservoir 31 via the return line, or the medium discharge device 39, to make it available again for the water supply of the greenery elements 5 of the greenery system 3.

Figures 9A, 9B:
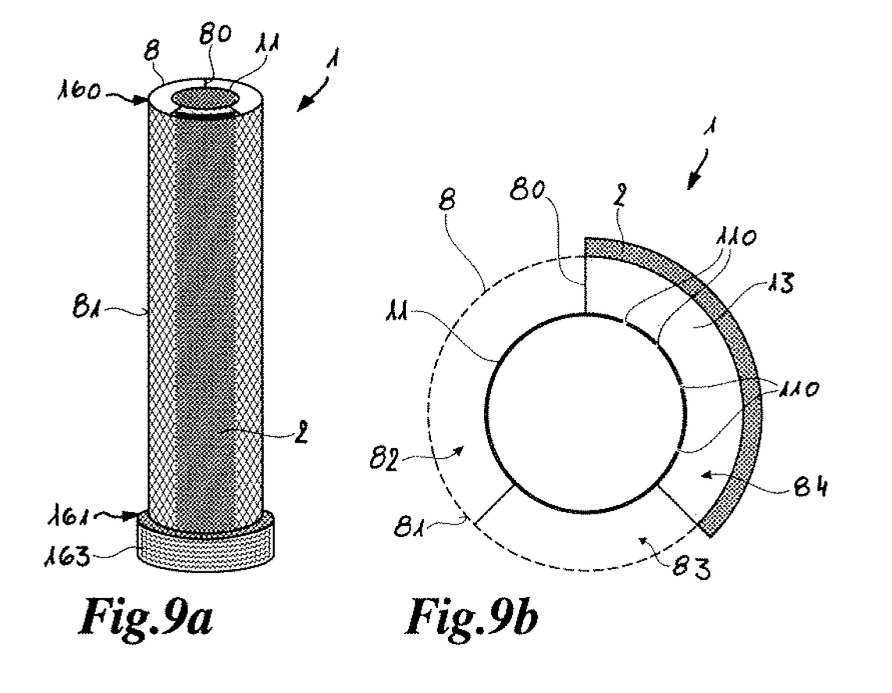

In FIGS. 9a and 9b is an alternative embodiment of the body through which a medium can flow 1, which can be used as vertical blinds. The body through which a medium can flow 1 is not greened all the way around in the variant shown in FIGS. 9a and 9b; rather, its exterior has an unoccupied surface for provision of, for example, solar cells, at least one lighting device, or even an advertisement or similar. In this embodiment variant of the body through which a medium can flow 1, it is thus not required to have separate solar modules; rather, these can be arranged directly on the exterior of the body through which a medium can flow 1. For this purpose, the body through which a medium can flow 1 has on its exterior a cylindrical perforated sheet 8 as an outer skin surface of the body through which a medium can flow 1, a distance from which is the supporting body 11, here in the form of an inner pipe, and dividers 80 as spacers between the supporting body 11 formed as an inner pipe and the cylindrical perforated sheet 8. The device for absorbing nutrients and/or fluid 13, in particular in the form of a foam material, is in the space between the supporting body 11, the cylindrical perforated sheet 8, and two dividers 80, which delimit a ring segment or segment 84. The plant layer 2 is grown on the exterior of the device for absorbing nutrients and/or fluid 13 as greening. In this section or segment 84 of the body through which a medium can flow 1, there can be through holes or openings for supplying the plant layer 2 with medium, such as water, in the supporting body 11 formed as an inner pipe. These through holes 110 are only implied in FIG. 9b. Medium, in particular water, can flow through the inner pipe, or the supporting body 11, and/or at least one pipe inserted there. Accordingly, the inner flow lumen 10 of the supporting body 11 formed as an inner pipe can be open. Furthermore, it is possible to fill this with for example absorbent granules so that the medium will be absorbed into this or can flow into this, and will accordingly be available for supplying the plant layer 2 of the exterior 81 of the cylindrical perforated sheet 8.

The segments 82, 83 of the bodies through which a medium can flow 1 that are not greened in FIGS. 9a and 9b, that is, do not contain the plant layer 2, can for example be used for arranging LEDs or solar cells, wherein these are arranged on the cylindrical perforated sheet 8 and can be attached there. This exterior 81 of the perforated sheet 8 is also available for additional planting, for example with different plants based on the season. Accordingly, for example, a segment 83 of the body through which a medium can flow 1 that is between two respective dividers 80 can be used for planting summer plants, and another segment 84 for planting winter plants. These segments can each have a device 13, in particular foam material. The exterior 81 of the cylindrical perforated sheet 8 of the body through which a medium can flow 1 can also be used as an advertising surface, for example in the area of segment 82 and/or 83, via a corresponding print or corresponding advertising medium.

Figure 10:
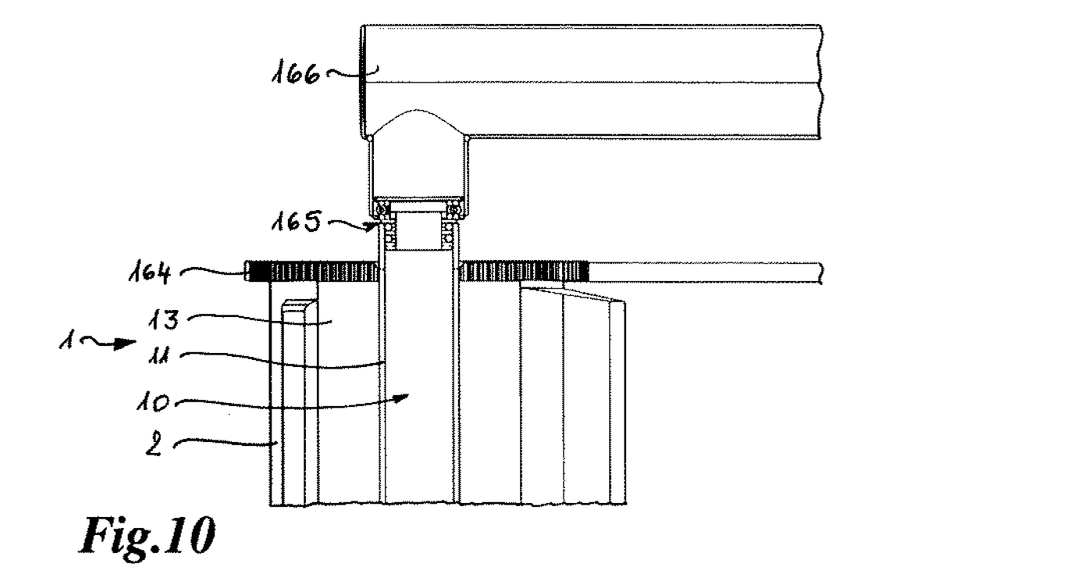
FIG. 10 A detail view of a body through which a medium can flow according to the invention with a drive device on the end and a quick-connecting device via which the body through which a medium can flow is connected to a distribution pipe.

There can be a cover plate 163 at the top or first end 160 and/or the bottom or second end 161 of the body through which a medium can flow 1 in FIG. 9a. As can be inferred from FIG. 10, there can also be a drive device 164 on the top or first end 160 of the body through which a medium can flow 1. This is a gear as an example in the example embodiment shown in FIG. 10, wherein there can also be another type of drive device here. Rotation of the body through which a medium can flow 1, in particular that that is oriented vertically (in the form of vertical blinds), is possible via the drive device, which can for example be driven via an electric drive. Different sides or sections of the exterior of the body through which a medium can flow 1 can thereby be oriented differently based on the time of year or even the time of day, toward a building or a facade or a wall element, etc., or toward sunlight. A specific side or a specific circumferential section can thus be visible from the outside on demand at different times throughout the day, while the other circumferential section of the body through which a medium can flow 1 is oriented, for example, toward the facade of a building, a wall element, etc. To enable smooth rotation of the body through which a medium can flow 1, this has at its top or first end 160 a quick-connect device 165, via which a connection of the supporting body 11 formed as an inner pipe to a distribution pipe 166 is possible. The quick-connect device 165 can be designed as a one-click-style mechanism, and it enables in particular a quick replacement of the body through which a medium can flow 1, and thus individual slats 4 of a greenery element 5 or the greenery system 3 in the event of service or repair work. The quick-connect device 165 can easily be accessed and operated in particular from the accessible side, such as a front side, of a corresponding greenery element 5, without removing other components from this. Additionally, disassembly of the entire greenery system 3 upon failure is not required and entails only removal of individual slats 4. A spring-loaded pressure plate, for example, can also be provided as a possible embodiment of the quick-connect device 165, the plate being designed such that it can be plugged into a receptacle in the distribution pipe 166. Other embodiment variants of the quick-connect device 165 are also possible.

Within the supporting body 11 formed as an inner pipe, there can also be at least one riser pipe, which serves to drain medium in the event of complete saturation of the absorbent granules that fill the inner pipe.

In addition to the embodiment variants of bodies through which a medium can flow and a greenery system with at least one greenery element with at least one such body through which a medium can flow that are described above and shown in the figures, numerous other embodiments can be designed, in particular any combinations of the aforementioned characteristics of these, wherein each of the bodies through which a medium can flow is either self-supporting or comprises at least one supporting body that provides mechanical stability and at least one device for absorbing nutrients and/or fluid, wherein a plant layer can be supported, grown, or located on the exterior of the body through which a medium can flow. The greenery system comprises at least one greenery element with at least one such body through which a medium can flow and at least one medium supply device for the supply of medium to the at least one body through which a medium can flow and at least one medium discharge device for directing medium out of the at least one greenery element, in particular into the ground.

REFERENCE DESIGNATION LIST

1 Body through which a medium can flow
2 Plant layer
3 Greenery system
4 Slat
5 Greenery element
6 Building
7 Pavilion
8 Cylindrical perforated sheet
10 Inner flow lumen
11 Supporting body
12 Exterior of 11
13 Device for absorbing nutrients and/or fluid 14 Exterior of 13
15 Pipe section
16 End
17 Funnel-shaped section
18 Valve flap
19 Interior
20 Supply line
31 Water reservoir
32 Pump device
33 Supply line
34 Filter element
35 Solar module
36 Electrical line
37 Power supply device
38 Medium supply device
39 Medium discharge device
40 Guide rail
41 Guide rail
42 Shade element
43 Hose
44 Supply line
45 Discharge line
46 Connecting line
60 Water collection element/rain gutter
61 Ground
62 Facade
63 Roof
65 Window
70 Wall element
71 Water collection element/rain gutter
72 Ground
80 Divider
81 Exterior
82 Segment
83 Segment
84 Segment
110 Through hole
130 Outer foam layer
131 Inner foam layer
150 Valve device
160 Top/first end
161 Bottom/second end
163 Cover plate
164 Drive device
165 Quick-connect device
166 Distribution pipe
D Outer diameter

What is claimed is:

1. A body through which a medium can flow, wherein the body through which the medium can flow is formed as a media line or one or more media line sections, the body through which the medium can flow comprising:
at least one exterior,
wherein the body through which the medium can flow is self-supporting or comprises at least one supporting body that provides mechanical stability,
wherein the body through which the medium can flow comprises at least one device for absorbing nutrients and/or fluid,
wherein the device is made of at least one open-cell foamed plastic or comprises the at least one open-cell foamed plastic,
wherein the exterior of the body through which the medium can flow is designed as a supporting device for supporting plants, and
wherein the device comprises at least one outer open-cell foam layer for stapling plants into and at least one inner foam layer, which serves to retain fluid and nutrients.

2. The body through which the medium can flow according to claim 1, wherein the media line or the one or more media line sections comprises/comprise on its/their end(s) at least one connecting or interface section and/or at least one connecting device for connection to at least one further body through which the medium can flow and/or for connection to at least one medium supply or discharge device.

3. The body through which the medium can flow according to claim 1, wherein the body through which the medium can flow is multi-layered and the layers are functional layers, wherein there is at least one water-guiding layer and/or at least one water-storing layer and/or at least one nutrient-storing layer and/or at least one layer for mechanical stabilization.

4. The body through which the medium can flow according to claim 1, wherein the body through which the medium can flow is designed as a hollow body and has at least one inner flow lumen and at least one wall that surrounds the at least one inner flow lumen, which is formed or surrounded at least in part by the at least one device for absorbing nutrients and/or fluid, and/or the body through which the medium can flow is formed entirely out of one or more open-cell foam materials, and/or at least one inner flow lumen of the body through which the medium can flow is filled with at least one open-cell foam material.

5. The body through which the medium can flow according to claim 1, wherein there is at least one device for moisture retention of the at least one body through which the medium can flow, having at least one valve device or at least one spring valve for medium supply control and/or for medium discharge control for controlling the supply and/or preventing the discharge of medium from the inside of the body through which the medium can flow.

6. The body through which the medium can flow according to claim 1, wherein the body through which the medium can flow has at least one exterior supporting device for supporting the plants and/or for arranging at least one lighting device, at least one solar module, at least one advertising device, and/or at least one drive device for targeted orientation of the body through which the medium can flow.

7. The body through which the medium can flow according to claim 1, wherein the body through which the medium can flow is formed as a media line or one or more media line sections comprising or able to comprise on its/their end(s) at least one connecting or interface section and/or at least one connecting device for connection to at least one further body through which the medium can flow and/or for connection to at least one medium supply or discharge device, wherein the body through which the medium can flow is multi-layered and the layers are functional layers, wherein there is at least one water-guiding layer and/or at least one water-storing layer and/or at least one nutrient-storing layer and/or at least one layer for mechanical stabilization.

8. The body through which the medium can flow according to claim 1, wherein the open-cell foamed plastic being based on at least one of the materials polyamide (PA), polypropylene (PP), polyethylene (PE), polyurethane (PUR), or at least one thermoset, or at least one bioplastic.

9. The body through which the medium can flow according to claim 1, wherein the open-cell foamed plastic is based on at least polylactic acid (PLA).

10. A body through which a medium can flow, wherein the body through which the medium can flow is formed as a media line or one or more media line sections, the body through which the medium can flow comprising:
- at least one exterior,
- wherein the body through which the medium can flow is self-supporting or comprises at least one supporting body that provides mechanical stability,
- wherein the body through which the medium can flow comprises at least one device for absorbing nutrients and/or fluid,
- wherein the device is made of at least one open-cell foamed plastic or comprises the at least one open-cell foamed plastic,
- wherein the exterior of the body through which the medium can flow is designed as a supporting device for supporting plants,
- wherein the at least one supporting body has the at least one device for absorbing nutrients and/or fluid exteriorly at least in sections.

11. A greenery system, comprising:
at least one greenery element for installation on a surface, and at least one medium supply device for feeding the at least one greenery element with medium and at least one medium discharge device for discharging medium out of the at least one greenery element, wherein the at least one greenery element comprises at least one body through which a medium can flow according to claim 1, and wherein the at least one body through which the medium can flow is or will be arranged in space such that there is a slope for generating a flow and/or distributing medium in the at least one body through which the medium can flow.

12. The greenery system according to claim 11, wherein the greenery system is constructed modularly and comprises a number of the bodies through which the medium can flow in the form of pipe sections, which are or adapted to be connected to one another in a releasable way.

13. The greenery system according to claim 12, wherein the greenery system is designed as a self-sufficient unit and the at least one medium supply device comprises at least one pump device for conveying medium to the at least one body through which the medium can flow of the at least one greenery element, and at least one power supply device for supplying the pump device with power, wherein in an operating position of the at least one greenery element the at least one body through which the medium can flow is/are in horizontal and/or vertical orientation and/or at at least one angle to the vertical, and/or that the at least one greenery element and/or the at least one body through which the medium can flow is/are attached to a building such that the at least one greenery element and/or its at least one body through which the medium can flow is/are fixed or movable.

14. The greenery system according to claim 11, wherein the greenery system is designed as a self-sufficient unit and the at least one medium supply device comprise at least one pump device for conveying medium to the at least one body through which the medium can flow of the at least one greenery element, and at least one power supply device for supplying the pump device with power.

15. The greenery system according to claim 11, wherein in an operating position of the at least one greenery element, the at least one body through which the medium can flow is/are in horizontal and/or vertical orientation and/or at at least one angle to the vertical, and/or that the at least one greenery element and/or the at least one body through which the medium can flow is/are attached to a building such that the at least one greenery element and/or its at least one body through which the medium can flow is/are fixed or movable.

16. The greenery system according to claim 11, wherein the at least one greenery element is arranged on a building facade and/or a wall element such that it is self-supporting or is designed as at least one wall element or facade element of a building and is connected or able to be connected in terms of fluid to the at least one medium supply device for supply of medium and the at least one medium discharge device for discharging medium.

17. The greenery system according to claim 11, wherein there is at least one filter element for filtering media flowing in the area of the medium supply device.

18. A greenery system, comprising:
at least one greenery element for installation on a surface, and at least one medium supply device for feeding the at least one greenery element with medium and at least one medium discharge device for discharging medium out of the at least one greenery element, wherein the at least one greenery element comprises at least one body through which a medium can flow, wherein the body through which the medium can flow is formed as a media line or one or more media line sections, the body through which the medium can flow comprising:
- at least one exterior,
- wherein the body through which the medium can flow is self-supporting or comprises at least one supporting body that provides mechanical stability,
- wherein the body through which the medium can flow comprises at least one device for absorbing nutrients and/or fluid,
- wherein the device is made of at least one open-cell foamed plastic or comprises the at least one open-cell foamed plastic,
- wherein the exterior of the body through which the medium can flow is designed as a supporting device for supporting plants, and
- wherein the at least one body through which the medium can flow is or will be arranged in space such that there is a slope for generating a flow and/or distributing medium in the at least one body through which the medium can flow,
- wherein the at least one greenery element is designed in the form of a shading system to be located in front of one or more windows of a building, wherein slats are provided, the slats of the greenery element designed as the shading system having the at least one body through which the medium can flow or are designed as the body through which the medium can flow.

19. A body through which a medium can flow, comprising:
- at least one exterior,
- wherein the body through which the medium can flow is self-supporting or comprises at least one supporting body that provides mechanical stability,
- wherein the body through which the medium can flow comprises at least one device for absorbing nutrients and/or fluid,
- wherein the exterior of the body through which the medium can flow is designed as a supporting device for supporting plants,
- wherein the device is a made of at least one open-cell foamed plastic or comprises the at least one open-cell foamed plastic,
- wherein the device comprising at least one outer open-cell foam layer for stapling plants into and at least one inner foam layer, which serves to retain fluid and nutrients,
- wherein the body through which the medium can flow is formed as a media line or one or more media line sections, comprising on its/their end(s) at least one connecting or interface section and/or at least one connecting device for connection to at least one further body through which the medium can flow and/or for connection to at least one medium supply or discharge device, wherein the body through which the medium can flow is multi-layered and the layers are functional layers, wherein there is at least one water-guiding layer and/or at least one water-storing layer and/or at least one nutrient-storing layer and/or at least one layer for mechanical stabilization, wherein the at least one supporting body has the at least one device for absorbing nutrients and/or fluid exteriorly at least in sections, wherein the body through which the medium can flow is designed as a hollow body and has at least one inner flow lumen and at least one wall that surround the at least one inner flow lumen, which is formed or surrounded at least in part by the at least one device for absorbing nutrients and/or fluid, and/or the body through which the medium can flow is formed entirely out of one or more open-cell foam materials, and/or at least one inner flow lumen of the body through which the medium can flow is filled with at least one open-cell foam material.

20. The body through which the medium can flow according to claim 19, wherein there is at least one device for moisture retention of the at least one body through which the medium can flow having at least one valve device or at least one spring valve for medium supply control and/or for medium discharge control for controlling the supply and/or preventing the discharge of medium from the inside of the body through which the medium can flow, wherein the body through which the medium can flow has at least one exterior supporting device for supporting the plants and/or for arranging at least one lighting device, at least one solar module, at least one advertising device, and/or at least one drive device for targeted orientation of the body through which the medium can flow.

21. A greenery system, comprising:
at least one greenery element for installation on a surface, and at least one medium supply device for feeding the at least one greenery element with medium and at least one medium discharge device for discharging medium out of the at least one greenery element, wherein the at least one greenery element comprises at least one body through which a medium can flow, wherein the body through which the medium can flow is formed as a media line or one or more media line sections, the body through which the medium can flow comprising:
at least one exterior,
wherein the body through which the medium can flow is self-supporting or comprises at least one supporting body that provides mechanical stability,
wherein the body through which the medium can flow comprises at least one device for absorbing nutrients and/or fluid,
wherein the device is made of at least one open-cell foamed plastic or comprises the at least one open-cell foamed plastic,
wherein the exterior of the body through which the medium can flow is designed as a supporting device for supporting plants, and
wherein the at least one body through which the medium can flow is or will be arranged in space such that there is a slope for generating a flow and/or distributing medium in the at least one body through which the medium can flow,
wherein the greenery system is constructed modularly and comprises a number of the bodies through which the medium can flow in the form of pipe sections, which are adapted to be connected to one another in a releasable way,
wherein the greenery system is designed as a self-sufficient unit and the at least one medium supply device comprises at least one pump device for conveying medium to the at least one body through which the medium can flow of the at least one greenery element, and at least one power supply device for supplying the pump device with power,
wherein in an operating position of the at least one greenery element the at least one body through which the medium can flow is/are in horizontal and/or vertical orientation and/or at at least one angle to the vertical, and/or that the at least one greenery element and/or the at least one body through which the medium can flow is/are attached to a building such that the at least one greenery element and/or its at least one body through which the medium can flow is/are fixed or movable,
wherein the at least one greenery element is designed in the form of a shading system to be located in front of one or more windows of a building,
wherein slats are provided, the slats of the greenery element designed as a shading system having at least one body through which the medium can flow or are designed as such a body through which the medium can flow,
wherein the at least one greenery element is arranged on a building facade and/or a wall element such that it is self-supporting or is designed as at least one wall element or facade element of a building and is connected or able to be connected in terms of fluid to the at least one medium supply device for supply of medium and the at least one medium discharge device for discharging medium, and
wherein there is at least one filter element for filtering media flowing in the area of the medium supply device.

22. A body through which a medium can flow, wherein the body through which the medium can flow is formed as a media line or one or more media line sections, the body through which the medium can flow comprising:
at least one exterior,
wherein the body through which the medium can flow is self-supporting or comprises at least one supporting body that provides mechanical stability,
wherein the body through which the medium can flow comprises at least one device for absorbing nutrients and/or fluid,
wherein the device is made of at least one open-cell foamed plastic or comprises the at least one open-cell foamed plastic,
wherein the exterior of the body through which the medium can flow is designed as a supporting device for supporting plants,
wherein the body through which the medium can flow has at least one exterior supporting device for supporting the plants and/or for arranging at least one lighting device, at least one solar module, at least one advertising device, and/or at least one drive device for targeted orientation of the body through which the medium can flow, and wherein the body through which the medium can flow has at least one perforated sheet on the exterior of the body through which the medium can flow.

* * * * *